Feb. 8, 1944.  W. A. RIDDELL  2,341,387

DIAPHRAGM CONTROL MECHANISM

Filed March 13, 1943

WILLIAM A. RIDDELL
INVENTOR

BY *Newton M. Perrins*
*Donald H. Stewart*
ATTORNEYS

Patented Feb. 8, 1944

2,341,387

UNITED STATES PATENT OFFICE 2,341,387

DIAPHRAGM CONTROL MECHANISM

William A. Riddell, Rochester, N. Y., assignor to Eastman Kodak Company, Rochester, N. Y., a corporation of New Jersey Application March 13, 1943, Serial No. 479,128

3 Claims. (Cl. 95—64)

This invention relates to photography and more particularly to mechanism for controlling the opening in a diaphragm used in connection with an objective. Such diaphragms may be used in connection with an objective, but in most instances they are built into a photographic shutter which is provided with lens tubes for supporting parts of an objective. One object of my invention is to provide a diaphragm structure inside of a casing which is operable from the outside thereof and having connections through the casing which are so arranged that dust and moisture are excluded from the casing. Another object of my invention is to provide a simple type of diaphragm operating mechanism which eliminates the usual slots in the casing through which an operating lever may pass. Other objects will appear from the following specification, the novel features being particularly pointed out in the claims at the end thereof.

With most of the known types of photographic shutters the operating levers such as the levers used for setting the shutter, the shutter trigger and the diaphragm operating lever are customarily operated from the outside of the shutter and there are slots or openings in the walls of the shutter casing through which these levers pass. Not only does this construction materially weaken the shutter casing which should be very rigid in order to hold lens elements with the required degree of accuracy, but the slots provide openings through which moisture, dust and dirt can freely enter. I am aware that this problem is one which has been at least partially solved as indicated in Patent 1,240,073, Marks, September 11, 1917, but in this patent the diaphragm operating mechanism projects through a hole in the shutter cover and, while it is partially covered by a diaphragm plate, nevertheless the construction requires that the diaphragm plate be spaced from the cover and, accordingly, there remains a slot between the diaphragm plate and shutter cover through which dust and moisture can pass to the shutter mechanism.

While it is possible to use my diaphragm construction in a casing which is solely designed to support the elements of an objective, I nevertheless prefer to use my diaphragm construction as the diaphragm for a shutter of the between-the-lens type and, if desired, the mechanism shown in my Patent No. 2,099,866 for Photographic shutters, granted November 23, 1937, may be employed. When I refer to a casing in the following specification and claims it is to be understood that this casing may be a casing for a complete shutter mechanism or it may be a casing which contains only the diaphragm which can be advantageously used as a part of a lens barrel or in connection with lens elements without the lens mechanism.

Coming now to the drawing wherein like reference characters denote like parts throughout:

Figure 1:
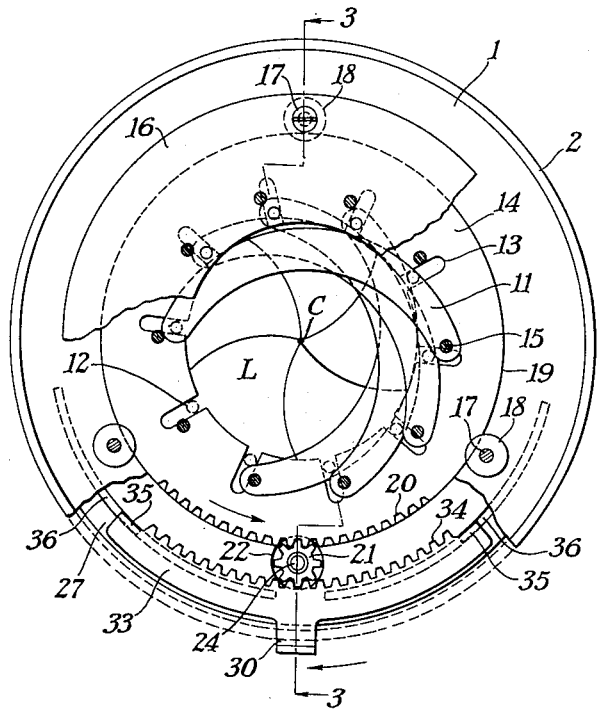
Fig. 1 is a front plan view of a shutter casing with the shutter cover removed and with parts broken away to show a diaphragm constructed in accordance with and embodying a preferred form of my invention.

My invention comprises a diaphragm which may include the usual diaphragm leaves pivoted at one end to a ring and having a pin and slot connection at the other end with a second ring, one of these rings being movable relative to the other to vary the position of the diaphragm leaves and consequently the size of the opening formed by the leaves. Such a diaphragm is mounted in a casing which is so constructed that motion may be transmitted to the diaphragm leaves through adjusting mechanism which passes through a wall in the shutter without, however, leaving any slot or opening through which moisture and dirt may pass.

More specifically my invention may comprise a casing, here shown as a circular casing 1 having a flange 2 extending around the periphery thereof and having a rearwardly extending tube 3 surrounding a central exposure opening 4. The rear tube 3 is preferably provided with external threads 5 by which the casing may be attached to a support such as a lens board, and it may be provided with internal thread 6 into which a lens cell may be screwed. The casing is normally covered by a cover 7 having a rabbeted connection at 8 with the upstanding flange 2 of the casing. The cover 7 may have a front tubular extension 9 interiorly threaded at 10 to support the front lens element.

Inside of this shutter I provide a diaphragm having a plurality of leaves 11, the leaves being similar in construction and including at one end of each leaf a pin 12 entering a slot 13 in a ring 14. On the other end of each diaphragm leaf there is a pin 15 pivotally attaching this end of the diaphragm leaf to a second ring 16.

In the present form of my invention the ring 16 may be attached by screws 17 to the casing 1 and there may be washers 18 surrounding the screws 17 and overlying the periphery 19 of the ring 14 to slidably mount this ring on the shutter 1.

Figure 3:
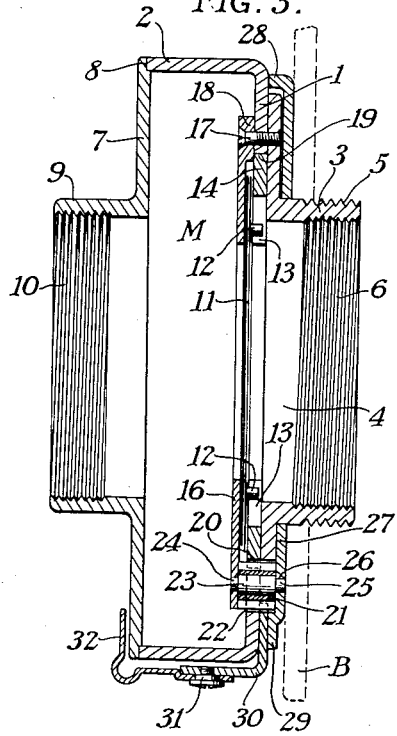
Fig. 3 is a section taken on line 3—3 of Fig. 1.
Figure 2:
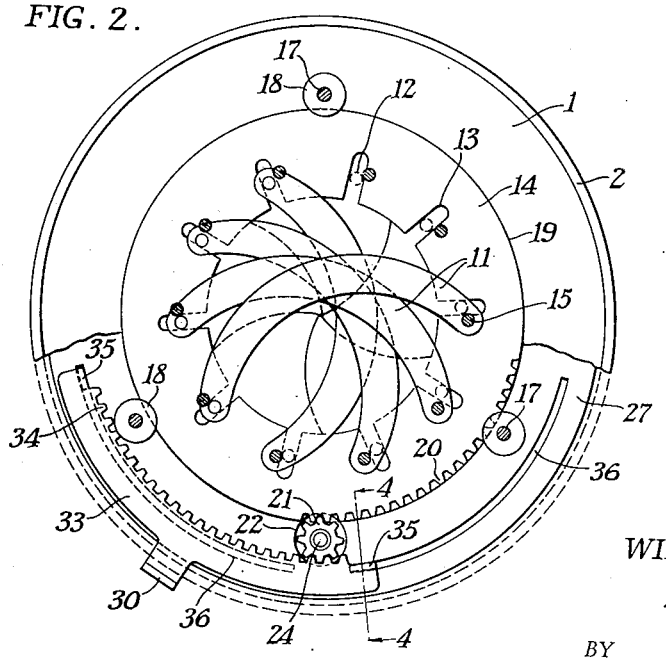
Fig. 2 is a view similar to Fig. 1 but with the parts in a different position.

The ring 14 carries a gear segment 20 having teeth meshing with a pinion 21. As best shown in Fig. 3 the pinion 21 extends through an aperture 22 in the casing 1 and has a shaft 23 journaled at 24 in the ring 16, there being a rear shaft 25 journaled at 26 in the guard plate 27.

Figure 4:
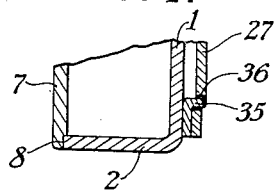
Fig. 4 is a fragmentary detail section on line 4—4 of Fig. 2.

The guard plate 27 is ring-shaped and is preferably formed downwardly at 28 and 29 about different parts of the periphery so that this plate will have a reasonably tight fit with the casing 1. Between the forming 29 and the casing 1 there is an arm 30 which may be attached by a screw 31 to a pointer 32 which moves about over a scale which may be applied to the cover 7. The arm 30 forms a part of an arcuate plate 33 which is a gear segment having teeth 34 meshing with the pinion 21. The ends of the arcuate plate 33 are provided with ears 35 which are adapted to engage in the slot 36 in the guard plate 27 as shown in Fig. 4. Thus the arcuate plate 33 is guided by this pin and slot connection so that it may turn about the center C of the casing.

The operation of the diaphragm is extremely simple. By moving the pointer 32, the arcuate member 33 through the teeth 34 moves the pinion 21 and this pinion in turn moves the diaphragm ring 14 through the gear segment 20. Thus, one end of each diaphragm leaf 11 is moved so that the diaphragm may be thus opened or closed to increase or decrease the size of the opening.

It should be noticed that with the construction above described there is a single opening 22 in the shutter casing, but this opening is quite well covered by the guard plate 27 and there is very little chance for dust or moisture to pass through this opening. It should be noticed from Fig. 3 that the thickness of the plates forming the diaphragm construction has been considerably exaggerated to make the construction clearer, but actually these plates, and particularly the arcuate plate 33, are made of quite thin metal. It should be remembered that ordinarily a casing of the type described is used on a camera and that the guard plate 27 may rest firmly against a lens board B so that the interior of the casing is quite adequately protected over the area used for the diaphragm adjusting mechanism and there is but little chance for moisture or dirt to enter the shutter casing.

As described above the casing may contain only a diaphragm, but it preferably contains a shutter mechanism such as the one shown in my patent above referred to. It will be noticed from Fig. 3 that I have shown a space for the shutter mechanism M and if such a mechanism is used the shutter may be provided with the usual shutter leaves L diagrammatically shown in Fig. 1. However, since it is unnecessary to show the complete shutter mechanism and since this forms no part of my present invention, it has been omitted from the drawings.

I claim:

1. A diaphragm for photographic lenses comprising, in combination, a diaphragm casing having a central aperture therein, a plurality of diaphragm leaves, a ring pivotally carrying one end of each diaphragm leaf, a second ring including a plurality of slots for supporting protuberances carried by the opposite ends of each diaphragm leaf, a gear segment on one of said rings, a pinion meshing with the gear segment and extending through a hole in the diaphragm casing, a guard plate carried by the diaphragm casing supporting one end of the pinion, and having arcuate slots therein, a second gear segment engaging the pinion and having protuberances guided by the arcuate slots and mounted between the guard plate and casing, and means carried by the second gear segment for transmitting movement to the diaphragm leaves through the two gear segments and pinion.

2. A diaphragm for photographic lenses comprising, in combination, a diaphragm casing having a central aperture therein, a plurality of diaphragm leaves, a ring pivotally carrying one end of each diaphragm leaf, a second ring including a plurality of slots for supporting protuberances carried by the opposite ends of each diaphragm leaf, a gear segment on one of said rings, the other of said rings being fixedly mounted, a pinion meshing with the gear segment and extending through a hole in the diaphragm casing, a guard plate carried by the diaphragm casing supporting one end of the pinion, the fixedly carried ring supporting the other end of said pinion, arcuate slots in the guard plate, a second gear segment outside of the diaphragm casing and inside of the guard plate, lugs on the gear segment engaged in the arcuate slots for slidably mounting the second gear segment, the second gear segment also engaging the pinion whereby movement may be transmitted to the diaphragm leaves through said gear segments and pinion.

3. A diaphragm for lenses, comprising in combination, a substantially circular casing having a central opening therein, a diaphragm including leaves adapted to cover and uncover at least parts of the opening, each leaf connected to two rings, one movably mounted with respect to the other, the movably mounted ring including a gear segment, a pinion meshing with the gear segment and extending through the casing, an adjustable member including a gear section meshing with the pinion and slidably carried on the outside of the casing, and guard plate covering the aperture in the casing through which the pinion passes and substantially sealing said opening to prevent dust or dirt from entering said casing, a pin and slot connection between said guard plate and the rack section mounted on the outside of the casing including said pin member carried by one of said parts entering said slots in the other of said parts to be guided thereby, said pin and slot connections being so positioned that said adjustable member including the gear section may turn about the center of the casing and remain in mesh with the pinion.

WILLIAM A. RIDDELL.